United States Patent
Paone et al.

(10) Patent No.: US 9,438,084 B2
(45) Date of Patent: Sep. 6, 2016

(54) EXPLOSION-PROOF BRAKING DEVICE WITH NON-MAGNETIC SHAFT FOR AN EXPLOSION-PROOF ELECTRIC MOTOR

(71) Applicants: Andrea Paone, Siziano (IT); Guido Paone, Siziano (IT)

(72) Inventors: Andrea Paone, Siziano (IT); Guido Paone, Siziano (IT)

(*) Notice: Subject to any disclaimer, the term of this patent is extended or adjusted under 35 U.S.C. 154(b) by 273 days.

(21) Appl. No.: 13/869,847

(22) Filed: Apr. 24, 2013

(65) Prior Publication Data
US 2013/0285493 A1   Oct. 31, 2013

Related U.S. Application Data

(60) Provisional application No. 61/639,272, filed on Apr. 27, 2012.

(51) Int. Cl.
| H02K 7/10 | (2006.01) |
|---|---|
| H02K 7/104 | (2006.01) |
| H02K 5/136 | (2006.01) |
| H02K 7/102 | (2006.01) |

(52) U.S. Cl.
CPC .............. *H02K 7/104* (2013.01); *H02K 5/136* (2013.01); *H02K 7/1025* (2013.01)

(58) Field of Classification Search
CPC ...... H02K 5/156; H02K 7/104; H02K 7/102; H02K 7/1021; H02K 7/1025; H02K 7/1028; H02K 7/1125
USPC ....................... 310/77, 92, 93, 108, 109, 123
See application file for complete search history.

(56) References Cited

U.S. PATENT DOCUMENTS 4,663,550 A * 5/1987 Kawada et al. ................ 310/93

| 5,699,883 | A * | 12/1997 | Albrecht ...................... 310/103 |
| 6,483,217 | B1 * | 11/2002 | Roth-Stielow et al. ........ 310/93 |
| 2002/0047389 | A1 * | 4/2002 | Okamiya ................. H02K 7/00 310/90 |
| 2008/0001489 | A1 * | 1/2008 | Paone et al. .................... 310/77 |
| 2009/0200983 | A1 * | 8/2009 | Dyer et al. ..................... 320/107 |

FOREIGN PATENT DOCUMENTS

| DE | 199 35 196 C1 | 12/2000 |
| GB | 1 040 864 A | 9/1966 |
| WO | 2005/098258 A1 | 10/2005 |

OTHER PUBLICATIONS

Italian Search Report dated Feb. 28, 2013, issued in Application No. IT MI20120715.
H. Greiner, *Motori Trifase per Antideflagranti per Esercizio Intermittente*, Organi di Transmissione, Tecniche Nuove, Milano, Italy, vol. 30, No. 9, Oct. 1, 1999, pp. 156-161.
Extended European Search Report dated Jun. 13, 2013, issued in Application No. 13165091.3.

* cited by examiner

*Primary Examiner* — Michael Andrews
(74) *Attorney, Agent, or Firm* — Workman Nydegger

(57) ABSTRACT

An explosion-proof braking device is described, which is configured to be connected to the front flange of an explosion-proof electric motor, the braking device comprising: a shaft (6) connected to the shaft of the motor from the outside, and provided with bearings (7, 8) internal to the device, an electromagnetic brake (11, 12, 13, 14) acting upon said shaft (6), comprising at least one excitation coil (11) and one air gap (10). The shaft (6) is made of a non-magnetic metal alloy, the bearings (7, 8) are so positioned as to lie outside the main flux lines of the magnetic field produced between the coil and the air gap, and the braking device is provided with flame-proof lamination joints of the through or closed type.

9 Claims, 3 Drawing Sheets

EXPLOSION-PROOF BRAKING DEVICE WITH NON-MAGNETIC SHAFT FOR AN EXPLOSION-PROOF ELECTRIC MOTOR

CROSS-REFERENCE TO RELATED APPLICATIONS

This application claims the benefit of U.S. Provisional Application No. 61/639,272, filed Apr. 27, 2012, which is incorporated herein by specific reference.

BACKGROUND OF THE INVENTION

1. Field of the Invention

The present invention relates to the field of explosion-proof electric motors, more specifically to an explosion-proof braking device for an explosion-proof electric motor.

2. Background Art

In the prior art, an explosion-proof self-braking electric motor is equipped with a brake in its rear part which is integral with the structure of the motor as one piece, so as to ensure the desired explosion-proof characteristics.

The known type of explosion-proof self-braking electric motor has a shaft which is integral with an electromagnetic brake disk: when current is supplied to the electromagnet, the brake disk opens and the electric motor is released from the brake; on the contrary, when the electromagnet receives no current, the brake disk is locked by the braking device, thus generating a braking torque that locks the motor shaft.

Said explosion-proof characteristics are subject to certification and must comply with strict regulations. Consequently, the explosion-proof self-braking electric motor is difficult and costly to manufacture, also because both the motor and the brake, since they are built as one piece, need to be changed depending on the nominal electric and mechanical characteristics required by the specific application.

The brake part of said motor requires more frequent checks and maintenance than the motor part. When installed in plants located in hazardous areas, it is not possible to carry out maintenance work on just one part of a device having a single flame-proof or explosion-proof enclosure, since said enclosure, being a single piece, cannot be opened on site. Therefore, the whole motor needs to be removed and brought to an authorized service shop: this may require stopping the plant because the entire device has to be replaced.

The need to ensure the explosion-proof characteristic makes the brake much more difficult to manufacture. It must be fitted with an enclosure where the connections of its mating parts must have mechanical characteristics subject to binding and strict tolerances, which are verified by certification bodies (e.g., French INERIS) through tests carried out under pressure in order to ascertain the correct behaviour of the device in the event of an explosion. For example, if a spark is generated inside in the presence of inflammable gases (such as acetylene) propagating both outside and inside the product, e.g., in a petrochemical plant, then an explosion may occur: in such a case, the spark must not be allowed to come out and the product must not explode.

WO2005/098258 describes an modular-disk electromagnetic brake that can be mounted to the front flange of an electric motor. However, the technical features of such a device can be improved in order to ensure the explosion-proof characteristic independently of the electric motor to which it will be coupled.

SUMMARY OF THE INVENTION

It is therefore one object of the present invention to provide an explosion-proof braking device for an explosion-proof electric motor which can solve the above-described problems as well as other problems that will be described below.

It is another object of the invention to provide an explosion-proof self-braking motor equipped with an external explosion-proof braking device.

A modular device is thus obtained, which allows to temporarily replace either the brake or the motor independently of each other, thus making for shorter plant downtime and ensuring faster interventions and lower downtime costs.

The explosion-proof modular-disk electromagnetic brake of the invention is an independent component that can be mounted to the front flange of an explosion-proof electric motor having unified flanges.

It is an object of the present invention an explosion-proof braking device as set out in claim 1, which is configured to be connected to the front flange of an explosion-proof electric motor, the braking device comprising: a shaft connected to the shaft of the motor from the outside, and provided with bearings internal to the device, an electromagnetic brake acting upon said shaft, comprising at least one excitation coil and one air gap; characterized in that said shaft is made of a non-magnetic metal alloy, said bearings being so positioned as to lie outside the main flux lines of the magnetic field produced between the coil and the air gap, said braking device being provided with flame-proof lamination joints of the through or closed type.

It is a particular object of the present invention to provide an explosion-proof braking device configured to be coupled to an explosion-proof electric motor as specifically set out in the appended claims, which are an integral part of the present description.

BRIEF DESCRIPTION OF THE DRAWINGS

Further objects and advantages of the present invention will become apparent from the following detailed description of an example of embodiment thereof and from the annexed drawings, which are only supplied by way of non-limiting example, wherein.

In the drawings, the same reference numerals and letters identify the same items or components.

DETAILED DESCRIPTION

Figure 1:
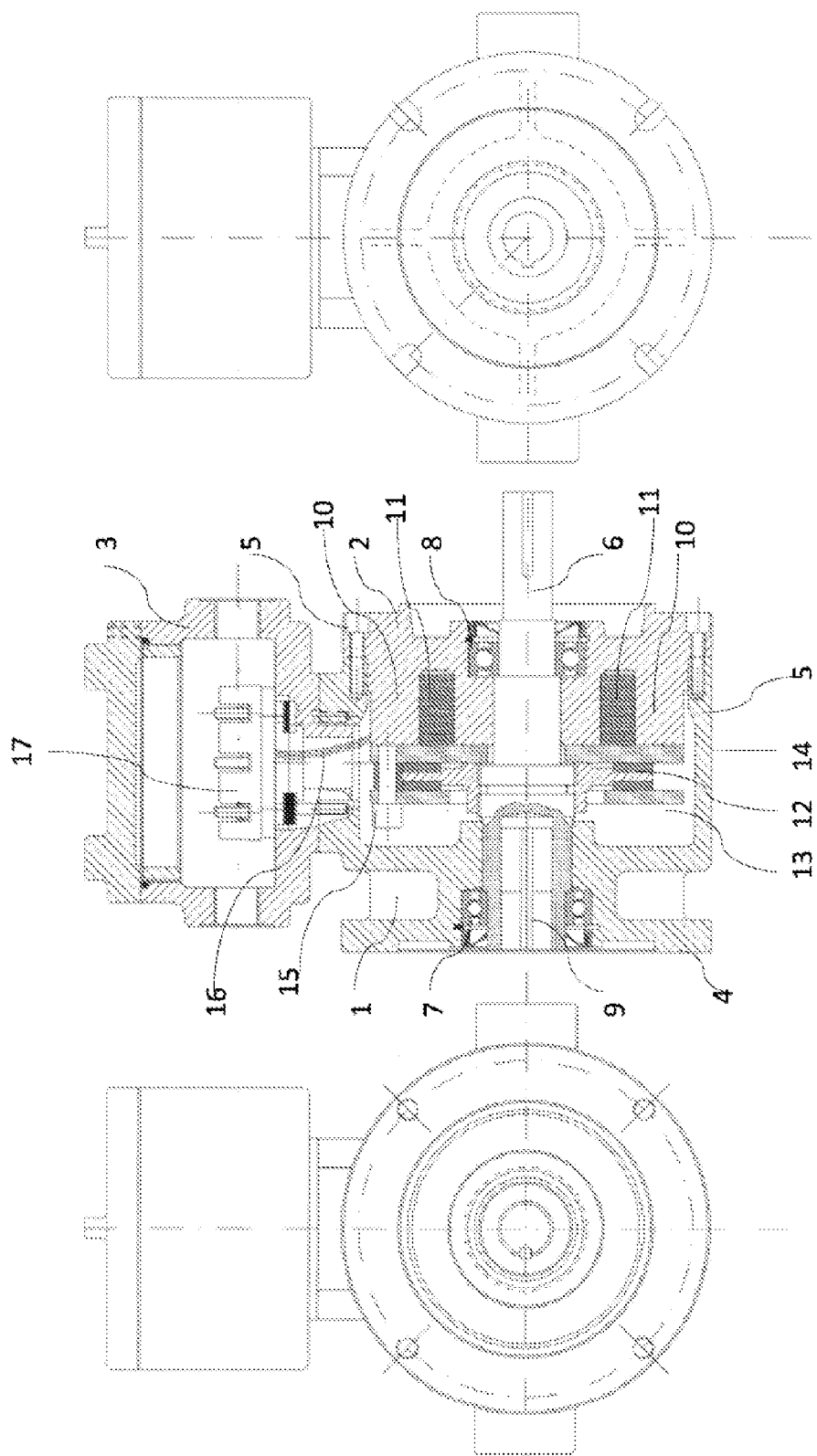
FIG. 1 shows a sectional view of the explosion-proof braking device of the present invention and the corresponding front views of the motor side and external side.
Figure 2:
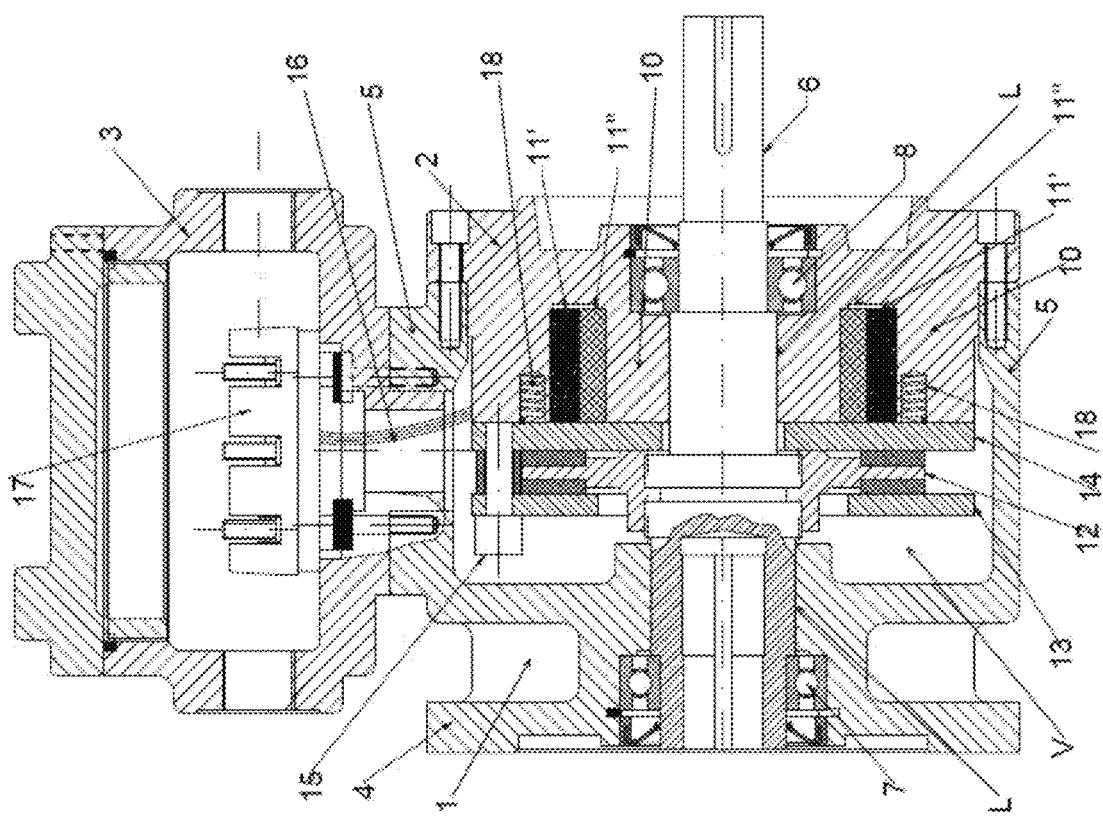
FIG. 2 is a sectional view of a variant of the explosion-proof braking device of the present invention.
Figure 3:
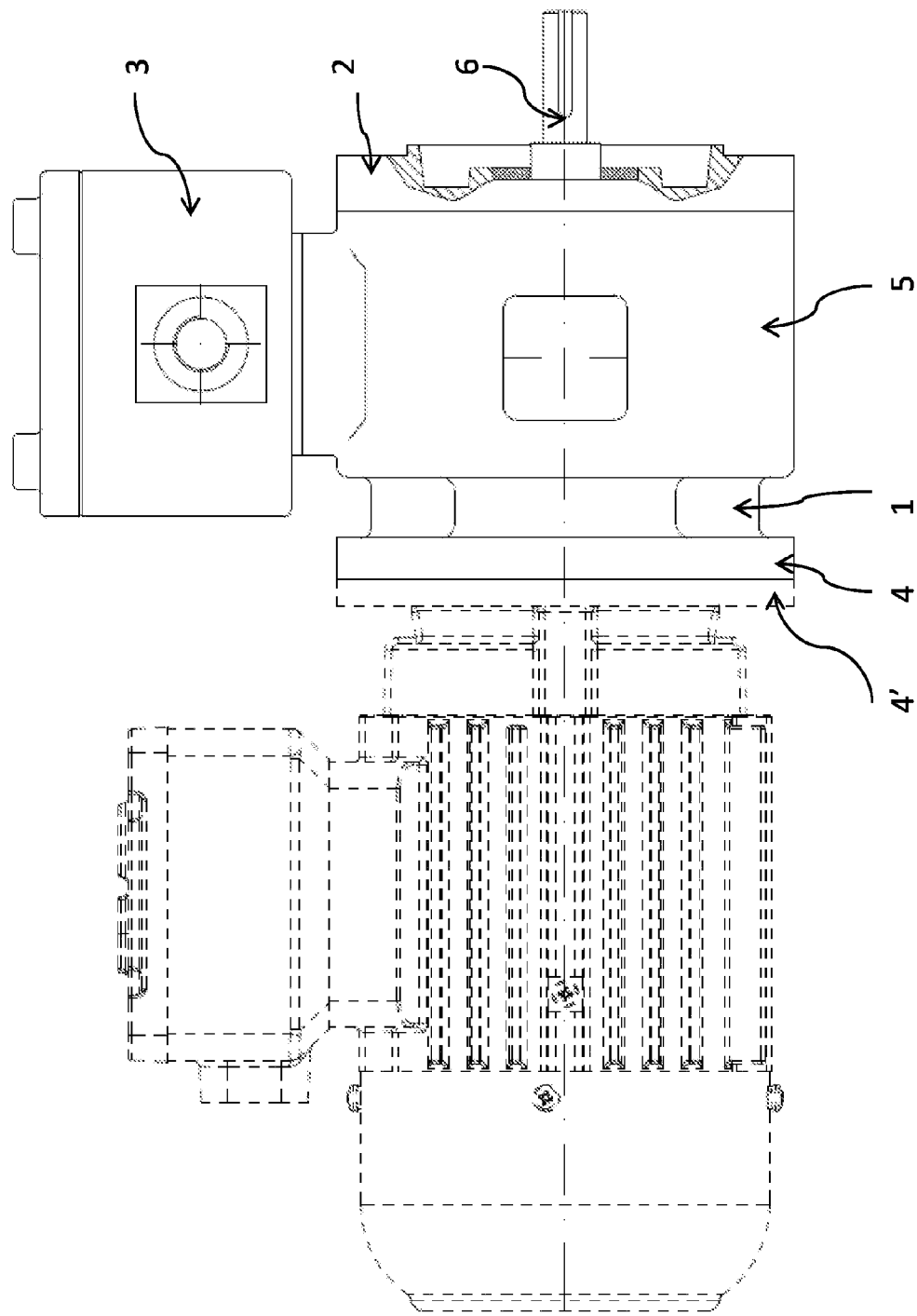
FIG. 3 is a side view of the explosion-proof braking device of the present invention when connected to a motor (indicated by a dashed line).

With reference to the drawings, the following will describe the elements that constitute the explosion-proof braking device according to the invention.

The enclosure that encloses the device comprises:
- a first part 1 (container), internally empty, ending on one side with a flange 4 adapted to be connected to a corresponding flange 4' of the front part of the motor M, and on the other side ending with an aperture 5;
- a second part 2, adapted to be inserted into and fastened to the opening of the first part; as will be described more in detail below, this second part houses the electromagnetic part of the brake and the brake disk;

a third part 3 acting as a terminal box, with the terminals for the electric connection of the brake.

The three parts are secured to one another by fastening means, e.g., screws.

A shaft 6, inserted in the enclosure, is adapted to rotate on bearings 7, 8 located at the ends of the enclosure; the end of the shaft facing towards the electric motor has a recess 9, into which the end part of the motor shaft, that comes out of the electric motor, is fitted. The other end of the shaft 6 comes out of the braking device as an extension of the motor shaft. The brake shaft is thus integrally connected to the motor shaft, which fits into the recess.

The second part 2 of the enclosure comprises internal extensions 10 that house an annular excitation coil 11. Such extensions acts as a forged air gap with double circular crowns, one internal and one external to the coil.

When current is applied to the coil 11, a magnetic field is generated: most of the flux lines of the magnetic field close within the internal part of the double crown; other flux lines of the magnetic field pass between the two external and internal parts of the enclosure.

A brake disk 12, arranged between a fixed friction plate 13 (facing towards the inside of the compartment) and a mobile anchor 14 (facing towards the magnet), is connected to the shaft 6. The mobile anchor 14 is pushed by disk pressure springs 18 towards the fixed plate 13, thus being able to stop the brake disk and hence the shaft. The anchor and the plate are connected, through fastening screws 15, to the internal part of the enclosure, which acts as an electromagnet. When no current is supplied to the magnet, the disk pressure springs hold the mobile anchor 14 against the brake disk 12, thus locking the shaft; when current is applied, instead, the magnets 11 attract the mobile anchor towards themselves, thus overcoming the force of the springs and releasing the brake disk.

According to one aspect of the invention, the explosion-proof electromagnetic brake is applied externally to the electric motor M in the front part thereof, where the shaft comes out. In this manner, the motor may be of a standard type, provided it has the explosion-proof characteristic.

In particular, the brake is secured to the output flange of the motor 4', thus creating a front extension of the motor itself, with an equivalent flange 4 (of the brake), without requiring any mechanical variations of the motor.

The size (diameter) of the brake does not exceed the size of the flange of the motor, and its length is limited to avoid generating an excessive bending moment.

In fact, the brake of the invention must have sufficient mechanical strength to be also able to carry the weight of the motor, since the motor-brake assembly is normally installed in a cantilever fashion, thus introducing a considerable bending moment. Also because of the minimal interstice, such bending might cause the shaft to rub against the lamination joints and to eventually fail.

According to a further aspect of the invention, the material of the brake enclosure is a nodular cast iron (e.g., GJS400), which is not very costly and has suitable mechanical characteristics.

The following will describe the features of the invention that ensure the attainment of the explosion-proof characteristic of the brake.

According to one aspect of the invention, the lamination joints, which constitute a possible source of flame emission, are manufactured with very tight tolerances and suitable lengths, so as to provide the flame-proof characteristic.

The joints are essentially of two types: through joints and closed joints.

Through joints are made up of junction parts between stationary elements and rotary elements, e.g., the brake shaft and the seat thereof, with only 0.2 mm (0.008 inch) of space, therefore requiring high machining precision; tolerance and length of the joint.

Closed joints consist of couplings between fixed parts, e.g., joined by screws, with gaskets or substances, such as lithium-based grease, that cannot be washed away, in between, also to avoid rust formation.

According to another aspect of the invention, the internal volume of the brake is reduced in order to ensure the explosion-proof characteristic, because a larger volume, should deflagration occur, may cause a pressure increase resulting in an explosion.

In particular, the length L of the through lamination joints is determined as a function of the internal volume V of the enclosure. For example, the proportions defined in the following table are observed, in compliance with the FM3600 and FM3615 regulations.

| Length of Flamepath (mm) | Max Gap of Flamepath (mm) for Enclosure Vol ($cm^3$) | | |
|---|---|---|---|
| Type of joint | ≤ 100 | 100 < V ≤ 2000 | V > 2000 |
| Flange & Spigot | | | |
| 6 ≤ L < 12.5 | 0.15 | — | — |
| 12.5 ≤ L < 25 | 0.15 | 0.15 | 0.10 |
| 25 ≤ L | 0.20 | 0.20 | 0.20 |
| Shafts and Rods | | | |
| 6 ≤ L < 12.5 | 0.15 | — | — |
| 12.5 ≤ L < 25 | 0.15 | 0.15 | 0.10 |
| 25 ≤ L < 40 | 0.20 | 0.20 | 0.20 |
| 40 ≤ L | 0.25 | 0.25 | 0.25 |
| Shafts with Ball/Roller Bearing | | | |
| 6 ≤ L < 12.5 | 0.23 | — | — |
| 12.5 ≤ L < 25 | 0.25 | 0.23 | 0.15 |
| 25 ≤ L < 40 | 0.20 | 0.30 | 0.30 |
| 40 ≤ L | 0.38 | 0.38 | 0.38 |

According to further aspects of the invention, the operating temperature of the brake must not exceed a certain limit.

When voltage is applied, a magnetic field is generated in the area of the coil, which, due to the small spaces, causes magnetization of the entire surrounding space, and hence of the whole device.

First of all, the problem of magnetization of the shaft 6 has been identified: because of the magnetic flux, the rotating shaft is subject to a counter-electromotive braking torque that opposes to rotation, thereby creating friction and heat, with adverse effects on the explosion-proof characteristic.

Furthermore, the shaft must also have adequate torsional strength when transmitting torque. Therefore, for example, the prior-art solution employing a shaft made of stainless steel (e.g., ISI430) is not feasible because the shaft would tend to break, in that its torsional strength would not be sufficient to withstand the torques involved with high angular speed gradients, e.g., in the event of sudden braking.

According to one aspect of the invention, the shaft is made of a non-magnetic metal alloy subjected to a particular heat treatment.

The material employed has very good tenacity characteristics, and allows hardening and cementing the shaft with a special heat treatment that eliminates the shaft heating effect during its rotation.

More in particular, in a non-limiting example the shaft is made of a steel alloy with the following additional components, expressed in percentage values:

| C | Mn | Si | Cr | Ni | Mo | Altri/Others |
|---|---|---|---|---|---|---|
| .12 + .22 | ≤1.50 | ≤1.00 | 15.00 + 17.00 | 1.50 + 2.50 | | S ≤ .030/P ≤ .040 |

The shaft is then machined to obtain the desired shape; it is then subjected to a hardening treatment, wherein it is brought to a given temperature (e.g., 1,000° C.-1,832° F.); it is then immersed into oil; subsequently, it is drawn to a given temperature (e.g., 650-760° C., 1,200-1,400° F.); finally, it is subjected to surface cementation, e.g., to a depth of approx. 1.5 mm (0.06 inch).

The diameter of the end parts of the shaft is advantageously smaller than the diameter of the central part: it is thus possible to insert the bearings 7, 8 at the points of diameter variation, so that they can stop flame propagation from the inside to the outside.

According to a further aspect of the invention, the position of the bearings 7, 8 is determined in such a way that they lie outside the main flux lines of the magnetic field produced by the coil 11, especially the bearing 8, which is located in the vicinity of the coil.

Thus, the flux of the magnetic field will not interfere with the rotation of the bearing balls, which would otherwise be subject to heating through the effect of the rotary motion, leading to problems similar to those of the shaft: in this case as well, the known solution using stainless steel bearings would not solve the problem.

Both ball bearings are fitted from the outside, and are sized to withstand the torques (axial forces) generated by the motor at the shaft revolution speed (e.g., up to 3,600 rpm).

Further aspects of the invention concern the electromagnetic excitation system of the brake, which is suitable for use within a particularly wide range of power voltages, in particular 200-480 VAC, single-phase or three-phase.

The excitation coil 11 must not overheat, must comply with certain temperature classes, and must be suitable for continuous operation without interruptions and without blowing.

According to the invention, the annulus coil 11 is provided with two separate concentric windings (e.g., made of copper) 11', 11", wound one over the other on a core, thus forming coils with two couples of terminals 16. In this manner, the two windings can be connected in series or in parallel depending on nominal voltage.

The two couples of terminals 16 are brought to the terminal strip 17 of the terminal box 3.

The latter contains an electric power system that comprises a rectifier working at half-wave, which is adapted to halve the output voltage.

The rectifier is also equipped with a device which, as voltage is applied and the motor shaft starts to rotate, causes the latter to operate at full-wave for a very short time (a few tenths of a second), thus doubling the output voltage in a manner sufficient to energize the magnet and attract the mobile anchor of the brake, since a half-wave would not provide sufficient power; it will then return to half-wave operation, since thereafter only a smaller maintaining force will be required.

Thus, for example, even if the nominal operating voltage is the minimum voltage, the doubled initial voltage peak will be sufficient to attract the mobile anchor of the brake, because at that instant the maximum attraction force will need to be generated. The performance of the brake are thus left unchanged, especially as regards the required static braking torque (e.g., 40 Nm), which must not vary as a function of the available mains voltage. If voltage is lower, the rectifier may continue to operate at full-wave.

This provides the advantage that one product can be used for any nominal voltage value in the range of (200-480 V), by simply changing the connection of the windings.

It is apparent from the above description that each characteristic of the invention operates in synergy with the others to provide the explosion-proof braking device of the invention. Accessory features contribute to improving the design of the device.

The above-described embodiment example may be subject to variations without departing from the protection scope of the present invention, including all equivalent designs known to a man skilled in the art.

Economic advantages, in addition to the above-described technical advantages, can also be attained from the application of the present invention.

One advantage is that one product can be used for any nominal voltage value in the range of (200-480 V), by simply changing the connection of the windings.

Furthermore, product availability times become much shorter, e.g., in the case of replacement.

From the above description, those skilled in the art will be able to produce the object of the invention without introducing any further construction details.

What is claimed is:

1. An explosion-proof braking device configured so as to be connected to the front part of an explosion-proof electric motor, the braking device comprising:
   a shaft connected to the shaft of the motor from the outside, and provided with bearings internal to the device,
   an electromagnetic brake acting on said shaft, comprising at least an excitation coil and an air gap;
   wherein:
      said shaft is made of a non-magnetic steel alloy that eliminates counter-electromotive braking torque on the shaft during rotation,
      said bearings are positioned so as to be to the outside of the main flux lines of the magnetic field produced between the coil and the air gap,
      said excitation coil is of the annulus type, comprising with two separate windings that are concentrically wound one over the other, thus forming coils with two couples of ends, said two windings being connectable in series or in parallel,
      said braking device being provided with flame-proof lamination joints of the through or closed type,
      wherein the electromagnetic brake further comprises:
         a disk brake connected to the shaft,
         a movable anchor, and
         at least one spring,
         wherein when the excitation coil is not energized, the at least one spring pushes the movable anchor toward the disk brake for locking the disk brake and when the excitation coil is energized, both windings produce a magnetic field that pulls the movable anchor away from the disk brake so that the disk brake can freely rotate.

2. The explosion-proof braking device as in claim 1, comprising a casing, said casing comprising:
   a first part, internally empty, ending on one side with a flange adapted to be connected to a corresponding flange of the front part of the motor, and on the other side ending with an aperture;

a second part adapted to be inserted into and fastened to said aperture of the first part; said second part housing said electromagnetic brake;

a third part acting as a terminal box, with the terminals for the electric connection of the brake.

3. The explosion-proof braking device as in claim 2, wherein said casing is made of nodular cast iron.

4. The explosion-proof braking device as in claim 1, wherein said shaft has been subjected to a hardening treatment, then immersed into oil, then drawn, and finally subjected to surface cementation.

5. The explosion-proof braking device as in claim 1, wherein said shaft has surface cementation.

6. The explosion-proof braking device as in claim 1, wherein said steel alloy includes C, Mn, Si, Cr, and Ni.

7. The explosion-proof braking device as in claim 1, further comprising an enclosure having an annular slot in which both windings are received.

8. The explosion-proof braking device as in claim 1, wherein one of the windings is wound directly over the other winding.

9. An explosion-proof braking device configured so as to be connected to the front part of an explosion-proof electric motor, the braking device comprising:

a shaft connected to the shaft of the motor from the outside, and provided with bearings internal to the device, an electromagnetic brake acting on said shaft, comprising at least an excitation coil and an air gap;

wherein:

said shaft is made of a non-magnetic steel alloy that eliminates counter-electromotive braking torque on the shaft during rotation, said bearings are positioned so as to be to the outside of the main flux lines of the magnetic field produced between the coil and the air gap, said excitation coil is of the annulus type, comprising with two separate windings that are concentrically wound one over the other, thus forming coils with two couples of ends, said two windings being connectable in series or in parallel with one of the windings being wound directly over the other winding, said braking device being provided with flame-proof lamination joints of the through or closed type.

* * * * *